United States Patent

Habel et al.

[11] Patent Number: 5,921,673
[45] Date of Patent: Jul. 13, 1999

[54] ILLUMINATED THREADING TOOL

[76] Inventors: David M. Habel; Victoria Habel, both of 1856 Fleming Ave., Willow Grove, Pa. 19090

[21] Appl. No.: 08/970,012

[22] Filed: Nov. 13, 1997

[51] Int. Cl.[6] .................................. F21L 7/00; F21V 8/00
[52] U.S. Cl. ............................................ 362/577; 362/120
[58] Field of Search .................................... 362/110, 120, 362/577

[56] References Cited

U.S. PATENT DOCUMENTS

| | | | |
|---|---|---|---|
| 2,336,136 | 12/1943 | Thomson et al. | 362/120 |
| 2,358,576 | 9/1944 | Jackell | 362/120 |
| 2,670,427 | 2/1954 | Barlet et al. | 362/120 |
| 3,582,638 | 6/1971 | Peters | 362/577 X |
| 4,302,797 | 11/1981 | Cooper | 362/119 |
| 5,152,598 | 10/1992 | Schaffer | 362/120 |
| 5,351,168 | 9/1994 | Easley | 362/577 |
| 5,628,556 | 5/1997 | Hrabar et al. | 362/120 |

Primary Examiner—Laura Tso

[57] ABSTRACT

A new tool for assisting a user in inserting an elongate flexible member through a grommet mounted in a barrier to reach an opposite side of the barrier. The inventive device includes a handle adapted to fit in a user's hand and a shaft to which an elongate flexible member may be connected such that insertion of the shaft of the tool through a grommet pulls the flexible member through the grommet. The shaft of the tool may be withdrawn from the grommet with the flexible member left passing through the barrier to the opposite side thereof.

14 Claims, 2 Drawing Sheets

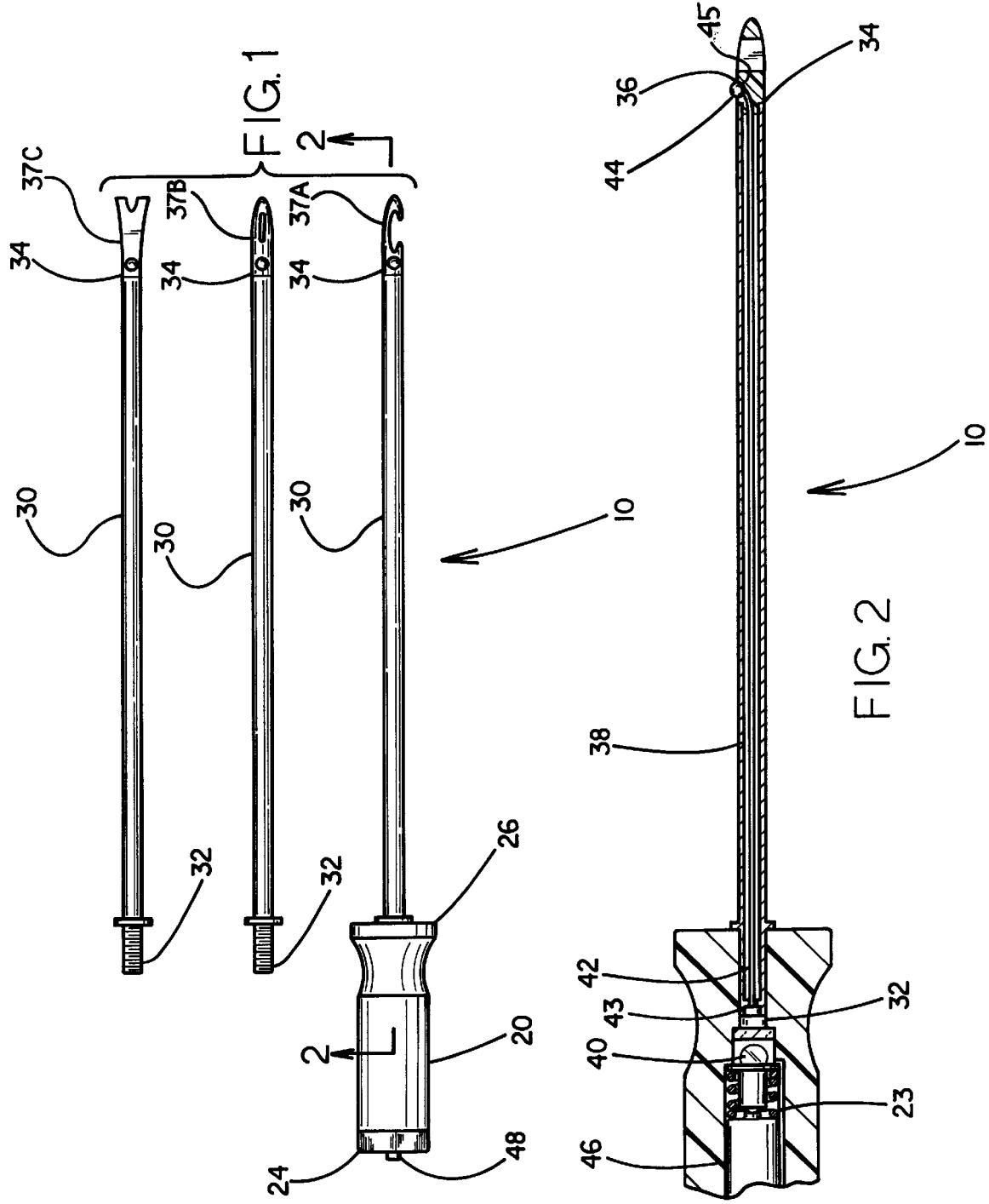

ILLUMINATED THREADING TOOL

BACKGROUND OF THE INVENTION

1. Field of the Invention

The present invention relates to threading tools and more particularly pertains to a new tool for assisting a user in inserting an elongate flexible member through a grommet mounted in a barrier to reach an opposite side of the barrier.

2. Description of the Prior Art

The use of threading tools is known in the prior art. More specifically, threading tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art threading tools include U.S. Pat. No. 4,348,715; U.S. Pat. No. 4,763,546; U.S. Pat. No. Des. 345,900; U.S. Pat. No. 4,087,907; U.S. Pat. No. 5,369,555; and U.S. Pat. No. 4,283,757.

While these devices fulfill their respective, particular objectives and requirements, the aforementioned patents do not disclose a new tool. The inventive device includes a handle adapted to fit in a user's hand and a shaft to which an elongate flexible member may be connected such that insertion of the shaft of the tool through a grommet pulls the flexible member through the grommet. The shaft of the tool may be withdrawn from the grommet with the flexible member left passing through the barrier to the opposite side thereof.

In these respects, the tool according to the present invention substantially departs from the conventional concepts and designs of the prior art, and in so doing provides an apparatus primarily developed for the purpose of assisting a user in inserting an elongate flexible member (such as an insulated electrical wire) through a grommet mounted in a barrier (such as a vehicle firewall) to reach an opposite side of the barrier.

SUMMARY OF THE INVENTION

In view of the foregoing disadvantages inherent in the known types of threading tools now present in the prior art, the present invention provides a new tool construction wherein the same can be utilized for assisting a user in inserting an elongate flexible member through a grommet mounted in a barrier to reach an opposite side of the barrier.

The general purpose of the present invention, which will be described subsequently in greater detail, is to provide a new tool apparatus and method which has many of the advantages of the threading tools mentioned heretofore and many novel features that result in a new tool which is not anticipated, rendered obvious, suggested, or even implied by any of the prior art threading tools, either alone or in any combination thereof.

To attain this, the present invention generally comprises a handle adapted to fit in a user's hand and a shaft to which an elongate flexible member may be connected such that insertion of the shaft of the tool through a grommet pulls the flexible member through the grommet. The shaft of the tool may be withdrawn from the grommet with the flexible member left passing through the barrier to the opposite side thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tool apparatus and method which has many of the advantages of the threading tools mentioned heretofore and many novel features that result in a new tool which is not anticipated, rendered obvious, suggested, or even implied by any of the prior art threading tools, either alone or in any combination thereof.

It is another object of the present invention to provide a new tool which may be easily and efficiently manufactured and marketed.

It is a further object of the present invention to provide a new tool which is of a durable and reliable construction.

An even further object of the present invention is to provide a new tool which is susceptible of a low cost of manufacture with regard to both materials and labor, and which accordingly is then susceptible of low prices of sale to the consuming public, thereby making such tool economically available to the buying public.

Still yet another object of the present invention is to provide a new tool which provides in the apparatuses and methods of the prior art some of the advantages thereof, while simultaneously overcoming some of the disadvantages normally associated therewith.

Still another object of the present invention is to provide a new tool for assisting a user in inserting an elongate flexible member (such as an insulated electrical wire) through a grommet mounted in a barrier (such as a vehicle firewall) to reach an opposite side of the barrier.

Yet another object of the present invention is to provide a new tool which includes a handle adapted to fit in a user's hand and a shaft to which an elongate flexible member may be connected such that insertion of the shaft of the tool through a grommet pulls the flexible member through the grommet. The shaft of the tool may be withdrawn from the grommet with the flexible member left passing through the barrier to the opposite side thereof.

Still yet another object of the present invention is to provide a new tool that allows a user to utilize existing grommets in the firewall and permits ease of installation or replacement of elongate flexible members while minimizing the possibility of damaging the grommet.

Even still another object of the present invention is to provide a new tool that includes a light source to afford the user an opportunity to more easily locate and utilize an existing grommet to thread elongate flexible members and thereby limit the possibility of creating a pathway for moisture and noxious gasses into the passenger compartment of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new tool showing the kit option with three shaft and tip combinations according to the present invention.

FIG. 2 is a schematic fragmentary view showing a portion of the interior of the present invention.

DESCRIPTION OF THE PREFERRED EMBODIMENT

Figure 3:
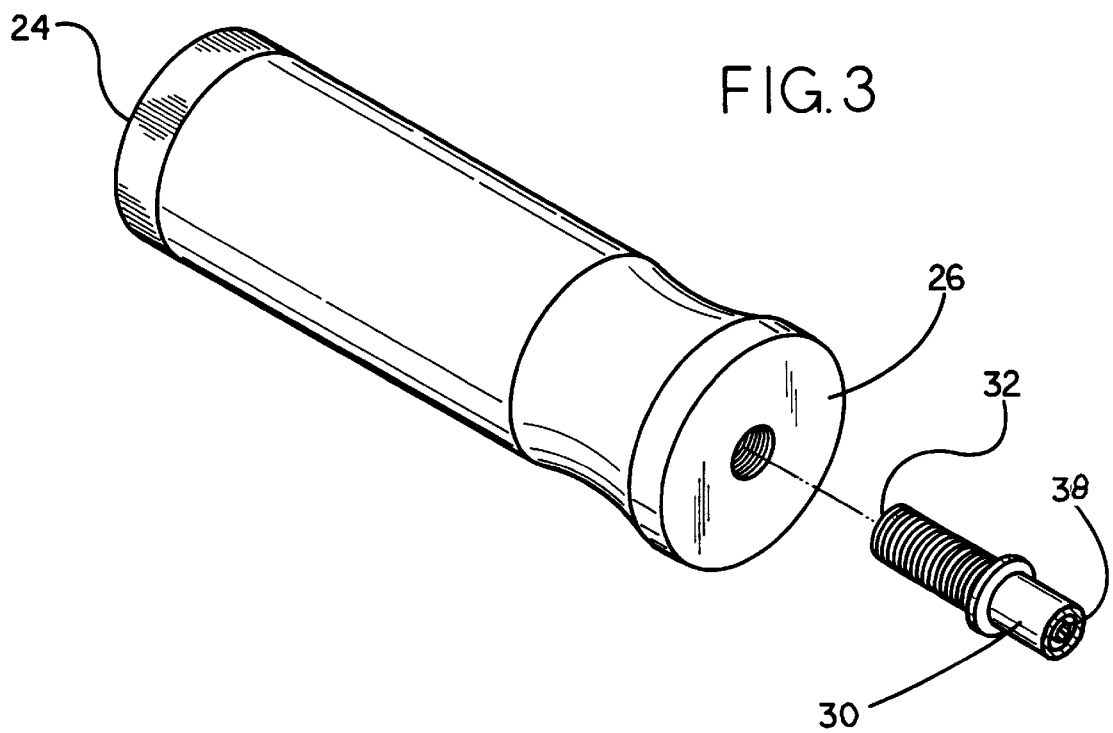
FIG. 3 is a schematic fragmentary view showing the attachment of the shaft to the handle of the present invention.
Figure 4:
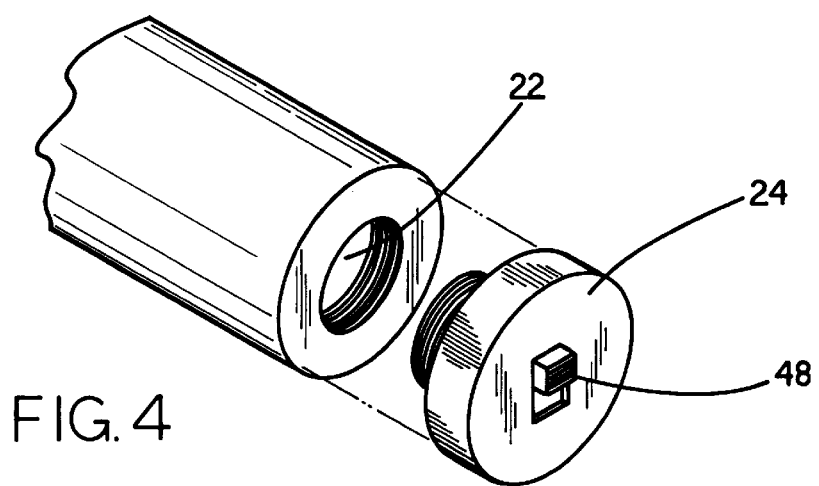
FIG. 4 is a schematic fragmentary view detailing the switch actuator of the present invention.

With reference now to the drawings, and in particular to FIGS. 1 through 6 thereof, a new tool embodying the principles and concepts of the present invention and generally designated by the reference numeral 10 will be described.

The tool 10 of the invention assists a user in inserting an elongate flexible member through a grommet mounted in a barrier (such as a vehicle firewall) to reach an opposite side of the barrier. The tool 10 is generally comprised of a handle 20 adapted to fit in a user's hand and a shaft 30 to which an elongate flexible member may be connected such that insertion of the shaft of the tool through a grommet pulls the flexible member also through the grommet and the shaft may be withdrawn from the grommet with the flexible member left passing through the barrier to the opposite side thereof.

Generally, a vehicle is equipped with a firewall which forms a barrier separating the engine compartment of the vehicle from the passenger area of the vehicle. The main electrical power supply (e.g., a battery or generator) for the vehicle is typically located within the engine compartment, but many of the vehicle components, accessories or controls which require electrical power are located within the passenger area. For example, an elongate flexible conductor member (such as coated copper wire) typically connects the vehicle power supply to the vehicle component requiring electrical power.

The conductor member in many cases must pass through the sheet metal which forms the firewall, and generally a hole is provided in the sheet metal to permit the conductor to pass through. A grommet, generally comprising a reinforced eyelet formed of an elastomeric material, is installed in each hole in the firewall during original manufacture to carry the elongate flexible conductor member through the firewall. The grommet extends through the hole in the firewall for protecting the conductor member from contact with any sharp edges of the sheet metal, and also provides a barrier to prevent moisture from entering the passenger area through the hole. However, to be an effective barrier, the holes and the grommets therein are typically made as small as possible, and are often located in the firewall at places that are often difficult to see and difficult to reach.

Existing methods used in the aftermarket to route elongate flexible members through the firewall include drilling additional holes through the firewall or removing an existing grommet from a firewall hole and replacing the grommet using the original hole. Drilling a hole through the firewall can be hazardous because a visual check for obstacles on the other side of the firewall is often difficult prior to drilling the hole. Utilizing an existing hole and grommet is therefore highly desirable, but difficulty in accessing the grommet prompts an installer to remove the grommet from the hole. Often, if a grommet is removed, the difficulty in replacing the grommet discourages reinstalling the grommet, and this results in a pathway for moisture and noxious gasses into the passenger compartment of the vehicle.

The handle 20 of the tool 10 preferably has an elongate cylindrical shape for easy grasping and holding while using the tool. Optionally, the handle may be contoured for greater grip comfort. The elongate cylindrical exterior shape also permits a hollow cylindrical interior 22 shape that is highly suitable for housing the components of a light source 40, which is a feature of the most preferred tool 10.

The preferred elongate cylindrical hollow interior 22 space preferably has a portion of the handle interior at the distal end 26 of handle 20 being open for accepting a portion of the shaft 30 for mounting the handle on the shaft. The handle interior is defined by an interior surface 23 which is preferably threaded at the distal end 26 of the handle 20 to threadably accept a threaded end portion of the shaft 30.

The preferred material of construction for the handle 20 is plastic, although wood or fiberglass could also be used. Plastic may be molded to a precise shape, and is more readily and reliably threadable to receive other elements of the tool 10.

The shaft 30 has a proximal end 32 adapted to be received by the handle 20. The shaft 30 also has a distal end 34 that terminates at the shaft tip 36. The tip 36 of the shaft 30 is adapted to engage an elongate flexible member. Preferably, the shaft tip 36 is constructed as a single unit with the shaft 30 so that the tip is not removable from the shaft. Optionally, the shaft tip 36 may be removably attached to the shaft distal end 34 by, for example, a retractable bearing fastener to permit the exchanging of tips.

The most preferred configuration of the shaft tip 36 is a substantially J-shaped hook 37A. The J-shaped hook 37A has a V-shaped crotch in which the elongate flexible member is lodged and held by concentrating pressure upon the flexible member and causing an indentation in the insulating covering of the elongate flexible member. Because the J-shaped hook 37A does not completely surround the flexible member, relatively easier release of the flexible member is permitted after passing through the grommet to the opposite side of the barrier as compared to other tip shapes. Optionally, a notched tip 37C or a tip 37B that has a hole through the hook (e.g., similar to the eye in a needle) are also useful configurations of the shaft tip 36.

Optimally, the shaft 30 comprises an elongate cylinder with a hollow interior 38. The proximal end 32 of the shaft 30 is preferably removably received by the distal end 26 of the handle 20. Most preferably, the proximal end 32 of the shaft 30 is threaded to permit threaded mounting thereof to the distal end 26 of the handle 20. As noted above, the distal end 26 has a threaded bore to receive the mating threads of the proximal end 32 of the shaft 30. Optionally, other removable attachment means may be used, such as a structure employing a retractable bearing and a mating detente. Also, a permanent fixed attachment of the handle 20 to the shaft 30 may be used if desired.

Preferably, the shaft 30 and the shaft tip 36 are constructed from a strong material which can also be suitably threaded, such as steel. Also preferably, the shaft is flexible and the surface of the shaft and shaft tip has low adhesion (e.g., a smooth surface) to facilitate inserting and removing the shaft through the aperture of a grommet. For example, a low friction polymeric coated steel may be used. Optionally, a relatively stiffer material may be used.

Most preferably, the tool 10 has a light source 40 for illuminating the area around the shaft tip 36 to facilitate the visibility of the shaft tip 36 when the tool is used near darker areas of the firewall. Preferably, the light source 40 and a power source 46 for the light source are located within the cylindrical chamber formed by the handle interior 22. Most preferably, the power source 46 is a replaceable battery adjacent to the light source 40, although a rechargeable battery that does not require regular replacement may be used. Also preferably, a switch is provided to selectively control the supply of power from the power source 46 to the light source 40. Optimally, the switch means has an actuator 48 provided at the proximal end 24 of the handle 20 so that manipulation of the tool 10 by the hand of the user on the handle does not accidentally turn the light source on or off.

Preferably, the light source 40 is comprised of a bulb. Use of a bulb as the light source is inexpensive and allows the user to vary the brightness thereof. Optionally, the light source may be a laser. The light source 40 uses a refractive lens 28 located in the handle 20 adjacent to the termination of the shaft proximal end 32 to direct light from the bulb to a first end 43 of the fiber optic cable 42.

The fiber optic cable 42 is located in the hollow interior 38 of the shaft 30 and carries the light from the light source 40 to the distal end 34 of the shaft 30 adjacent to the tip 36. The fiber optic cable 42 encloses one or more fibers and is an elongate member disposed within the shaft interior 38, with first end 43 of the fiber optic cable 42 located at the shaft proximal end 32 and adjacent to the refractive lens 28 (when the handle 20 and the shaft 30 are mounted together). The second end 44 of the fiber optic cable 42 is located at the distal end 34 of the shaft 30 adjacent to the tip 36.

Preferably, the second end 44 of the fiber optic cable 42 terminates at a plastic bead 45 located on the tip of the shaft 30 for refracting the light transmitted through the fiber optic cable 42. The fiber optic cable 42 directs a beam of light from the light source 40 through the fiber optic cable 42 to shine light through the plastic bead 45 at the tip 36 of the shaft 30 on the area adjacent to and generally in front of the shaft distal end 34 and the tip 36. Optionally, the tip comprises a translucent or transparent plastic material and the fiber optic cable second end 44 terminates in the interior of the tip to permit the entire tip to refract the transmitted light and "glow". The directed light enables the user of the tool 10 to more easily locate the grommet and insert the shaft 20 (along with the elongate flexible member) through the aperture of the grommet.

In one embodiment of the invention, the tool 10 is provided in a kit having a handle 20 and two or more shafts 30 with each shaft having a differently shaped tip. The provision of multiple shafts 30 with shaft tip 36 in a kit form permits convenient usage of the best choice of tool 10 for a specific application. In this embodiment of the invention, the shaft 30 is detachable from the handle 20 for simple interchangeability of the proper shaft and tip shape for a specific application, preferably by threaded attachment.

In using the tool 10 of the invention to insert an elongate flexible member through a grommet, a shaft 30 with the desired tip shape is initially selected and mounted on the handle 20. An elongate flexible member (such as an electrical wire) is mounted on the shaft tip 36 by lodging the wire in a hole or the constricted V-portion of the tip. The light source 40 is turned on using the switch actuator 48. Ideally, the grommet is visually located using the illumination provided by the fiber optic transmitted light. The tip 36 and a portion of the shaft 20 of the tool 10 is inserted into and pushed through the aperture of the grommet, with the electrical wire being pulled through the aperture behind the tip 36 and along side of the shaft 30. Once the desired length of electrical wire is passed through the grommet, the end of the electrical wire is disengaged from the tip 36 of the tool 10. The shaft 30 is pulled back through the grommet, leaving the electrical wire in place.

Use of the tool 10 of the invention permits an aftermarket serviceperson to utilize existing grommets in the firewall for installing replacement or additional elongate flexible members while minimizing the possibility of damaging the grommet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tool adapted for helping insert an elongate flexible member such as a wire through an aperture of a grommet, comprising:

a handle; and a shaft with a substantially uniform diameter along a length thereof and constructed from steel having a low friction lining, said shaft having a proximal end, and a distal end terminating at a tip, said shaft proximal end being accepted by said handle, said tip being adapted to engage an elongate flexible member for insertion of the elongate flexible member through the aperture of a grommet;

a light source and a fiber optic channel, said light source being disposed within an interior of said handle, wherein said shaft has an interior, said fiber optic channel having a first end and a second end, said fiber optic channel being disposed within said interior of said shaft, said fiber optic channel first end being positioned adjacent said light source, said fiber optic channel second end being positioned adjacent said shaft distal end and extending radially from said shaft for terminating with a bead mounted on a side outer surface of said shaft positioned adjacent to said tip of said shaft, said fiber optic channel being for directing a beam of light from said light source through said fiber optic channel from said fiber optic channel first end to said fiber optic channel second end to shine light on an area in front of said shaft distal end.

2. The tool of claim 1, wherein said tip forms a hook.

3. The tool of claim 2, wherein said hook is J-shaped to help engagement of said hook to a flexible member.

4. The tool of claim 1, wherein said tip has a notch to help engagement of said tip to a flexible member.

5. The tool of claim 1, wherein said tip has a hole therethrough to help engagement of said tip to a flexible member by insertion of a portion of the flexible member through said tip hole.

6. The tool of claim 1, wherein said handle is cylindrical and has an interior, a proximal end, a distal end.

7. The tool of claim 6, wherein said handle is elongate handle, and wherein said shaft is elongate.

8. The tool of claim 1, wherein said shaft proximal end is threadably engaged to said handle.

9. The tool of claim 1, wherein said shaft proximal end is detachable from said handle.

10. The tool of claim 1, further comprising a power source for providing power to said light source, said power source being disposed within said interior of said handle, said power source being operatively coupled to said light source.

11. The tool of claim 10, wherein said power source is a battery.

12. The tool of claim 10, further comprising a switch means for selectively controlling a supply of power from said power source to said light source.

13. The tool of claim 12, wherein said switch means has an actuator, said actuator being provided on said handle.

14. A kit adapted for helping insert an elongate flexible member such as a wire through an aperture of a grommet, comprising:

an elongate cylindrical handle having an interior, a proximal end, a distal end;

a light source for providing light being disposed within said interior of said handle;

a power source for providing power to said light source, said power source being disposed within said interior of said handle, said power source being operatively coupled to said light source;

a switch means for selectively controlling a supply of power from said power source to said light source, said switch means having an actuator, said actuator being provided at said handle proximal end;

an elongate first shaft with a uniform diameter along a length thereof and constructed from steel having a polymeric lining, said first shaft having an interior, a proximal end, and a distal end terminating at a tip, said first shaft tip forming a hook, said first shaft proximal end being receivable by said handle distal end, said first shaft proximal end being threadably engageable to said handle distal end with an annular flange for abutting said handle upon being threadably engaged with said handle, said hook having an outboard portion with a substantially J-shaped configuration and inboard portion having a substantially V-shaped crotch together defining a tapering generally conical tip having a substantially C-shaped cut out formed therein;

an elongate first fiber optic channel having a first end and a second end, said first fiber optic channel being disposed within said interior of said first shaft, said first fiber optic channel first end being positionable adjacent said light source when said first shaft proximal end is received by said handle, said first fiber optic channel second end being positioned adjacent said first shaft distal end and extending radially from said shaft for terminate with an enlarged plastic bead mounted on a side outer surface of said shaft positioned adjacent to said tip of said first shaft, said first fiber optic channel being for directing a beam of light from said light source through said first fiber optic channel from said first fiber optic channel first end to said first fiber optic channel second end to shine light on an area in front of said first shaft distal end;

an elongate second shaft with a uniform diameter along a length thereof and constructed from steel having a polymeric lining, said second shaft having an interior, a proximal end, and a distal end terminating at a tip, said second shaft tip having diverging side edges and a linear end edge with a substantially U-shaped notch to help engagement of said tip to a flexible member, said second shaft proximal end being receivable by said handle distal end with an annular flange for abutting said handle upon being threadably engaged within said handle, said second shaft proximal end being threadably engageable to said handle distal end;

an elongate second fiber optic channel having a first end and a second end, said second fiber optic channel being disposed within said interior of said second shaft, said second fiber optic channel first end being positionable adjacent said light source when said second shaft proximal end is received by said handle, said second fiber optic channel second end being positioned adjacent said second shaft distal end and extending radially from said shaft for terminate with an enlarged plastic bead mounted on a side outer surface of said shaft positioned adjacent to said tip of said second shaft, said second fiber optic channel being for directing a beam of light from said light source through said second fiber optic channel from said second fiber optic channel first end to said second fiber optic channel second end to shine light on the area in front of said second shaft distal end;

an elongate third shaft with a uniform diameter along a length thereof and constructed from steel having a polymeric lining, said third shaft having an interior, a proximal end, and a distal end terminating at a tip, said third shaft tip having substantially conical configuration with an elongated linear hole therethrough to help engagement of said tip to a flexible member by insertion of a portion of the flexible member through said tip hole, said third shaft proximal end being receivable by said handle distal end with an annular flange for abutting said handle upon being threadably engaged within said handle, said third shaft proximal end being threadably engageable to said handle distal end; and an elongate third fiber optic channel having a first end and a second end, said third fiber optic channel being disposed within said interior of said third shaft, said third fiber optic channel first end being positionable adjacent said light source when said third shaft proximal end is received by said handle, said third fiber optic channel second end being positioned adjacent said third shaft distal end and extending radially from said shaft for terminate with an enlarged plastic bead mounted on a side outer surface of said shaft positioned adjacent to said tip of said third shaft, said third fiber optic channel being for directing a beam of light from said light source through said third fiber optic channel from said third fiber optic channel first end to said third fiber optic channel second end to shine light on the area in front of said third shaft distal end.

* * * * *